US012175818B2

(12) United States Patent
Edwards et al.

(10) Patent No.: US 12,175,818 B2
(45) Date of Patent: Dec. 24, 2024

(54) CONDITION-ENABLING QUICK ENTRY TO ENCLOSED STRUCTURES AND METHODS OF USE THEREOF

(71) Applicant: Capital One Services, LLC, McLean, VA (US)

(72) Inventors: Joshua Edwards, Philadelphia, PA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 219 days.

(21) Appl. No.: 18/056,201

(22) Filed: Nov. 16, 2022

(65) Prior Publication Data

US 2024/0161559 A1 May 16, 2024

(51) Int. Cl.
*G07C 9/00* (2020.01)

(52) U.S. Cl.
CPC ................................ *G07C 9/00571* (2013.01)

(58) Field of Classification Search
None
See application file for complete search history.

(56) References Cited

U.S. PATENT DOCUMENTS 8,970,344 B2 3/2015 Payson et al.
10,139,789 B2 11/2018 Soni et al.
2018/0115552 A1* 4/2018 Kantubukta ........ H04L 41/0806

FOREIGN PATENT DOCUMENTS

WO 2014/203178 A1 12/2014

* cited by examiner

*Primary Examiner* — K. Wong
(74) *Attorney, Agent, or Firm* — Greenberg Traurig, LLP

(57) ABSTRACT

A method of receiving, by an access controlling server, a danger-related communication for an inclement danger condition. The access controlling server is in operational communication with a locking mechanism, controlling an opening and closing condition of a door of the enclosed structure. The access controlling server enables, based on the danger-related communication, an entry allowance setting of the locking mechanism of the door of the enclosed structure. The access controlling server adjusts the security restriction associated with the security-protected machine or the enclosed structure. The access controlling server transmits a push notification, informing a user in the area that the entry allowance setting of the locking mechanism of the access controlling server of the door of the enclosed structure is enabled. When the inclement danger condition has passed, the access controlling server instructs to re-adjust the entry allowance setting of the locking mechanism of the door of the enclosed structure.

20 Claims, 7 Drawing Sheets

CONDITION-ENABLING QUICK ENTRY TO ENCLOSED STRUCTURES AND METHODS OF USE THEREOF

FIELD OF TECHNOLOGY

The present disclosure generally relates to improved computer-based systems for condition-enabling quick entry to enclosed structures and methods of use thereof.

Background of Technology

Presently, many enclosed safe spaces require users to scan an access card to unlock the door of an enclosed space for security reasons. The users then have access to a sheltered and temperature-controlled area. In adverse conditions, the time it takes a user to retrieve and scan their access card could cause them to experience unfavorable conditions for longer than desired. Further, users without access cards would not be able to access the safe space as a temporary shelter in inclement conditions.

Summary of Described Subject Matter

In some embodiments, the present disclosure provides an exemplary technically improved computer-based system/method/that includes at least the following components/steps of receiving, by an access controlling server, at least one danger-related communication for at least one inclement danger-condition in at least one geographic area; enabling, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability; adjusting, by the access controlling server, from an initial security condition to an adjusted security condition, at least one security restriction associated with the at least one security-protected machine, the at least one enclosed structure, or both; transmitting, by the access controlling server, to an application installed on a computing device of at least one user, a push notification, informing, the at least one user in the at least one geographic area, about an entry availability to enter the at least one enclosed structure to avoid the at least one inclement danger-condition; and re-adjusting, by the access controlling server, when the at least one inclement danger-condition expires, from the adjusted security condition to the initial security condition, the at least one security restriction associated with the at least one security-protected machine, the at least one enclosed structure, or both.

In some embodiments, the present disclosure provides an exemplary technically improved computer-based system and method/that includes at least the following components and/or steps of a memory configured to store computer code; and a processor configured to execute the computer code stored in the memory that causes the processor to: receive, by an access controlling server, at least one danger-related communication for at least one inclement danger-condition in at least one geographic area; enable, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability; adjust, by the access controlling server, from an initial security condition to an adjusted security condition, at least one security restriction associated with the at least one security-protected machine, the at least one enclosed structure, or both; transmit, by the access controlling server, to an application installed on a computing device of at least one user, a push notification, informing, the at least one user in the at least one geographic area, about an entry availability to enter the at least one enclosed structure to avoid the at least one inclement danger-condition; and re-adjust, by the access controlling server, when the at least one inclement danger-condition expires, from the adjusted security condition to the initial security condition, the at least one security restriction associated with the at least one security-protected machine, the at least one enclosed structure, or both.

In some embodiments, the present disclosure provides an exemplary technically improved computer-based system/method/that includes at least the following components/steps of receiving, by an access controlling server, at least one danger-related communication for at least one inclement danger-condition in at least one geographic area; enabling, by the access controlling server, an entry allowance setting of a locking mechanism of a door of an at least one enclosed structure located within the at least one geographic area, the at least one enclosed structure hosts at least one security-protected machine and lacks a person-operated capability; adjusting, by the access controlling server, from an initial security condition to an adjusted security condition, at least one security restriction associated with the at least one security-protected machine, the at least one enclosed structure, or both; and transmitting, by the access controlling server, to an application installed on a computing device of at least one user, a push notification, informing, the at least one user in the at least one geographic area, about an entry availability to enter the at least one enclosed structure to avoid the at least one inclement danger-condition.

BRIEF DESCRIPTION OF THE DRAWINGS

Various embodiments of the present invention can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
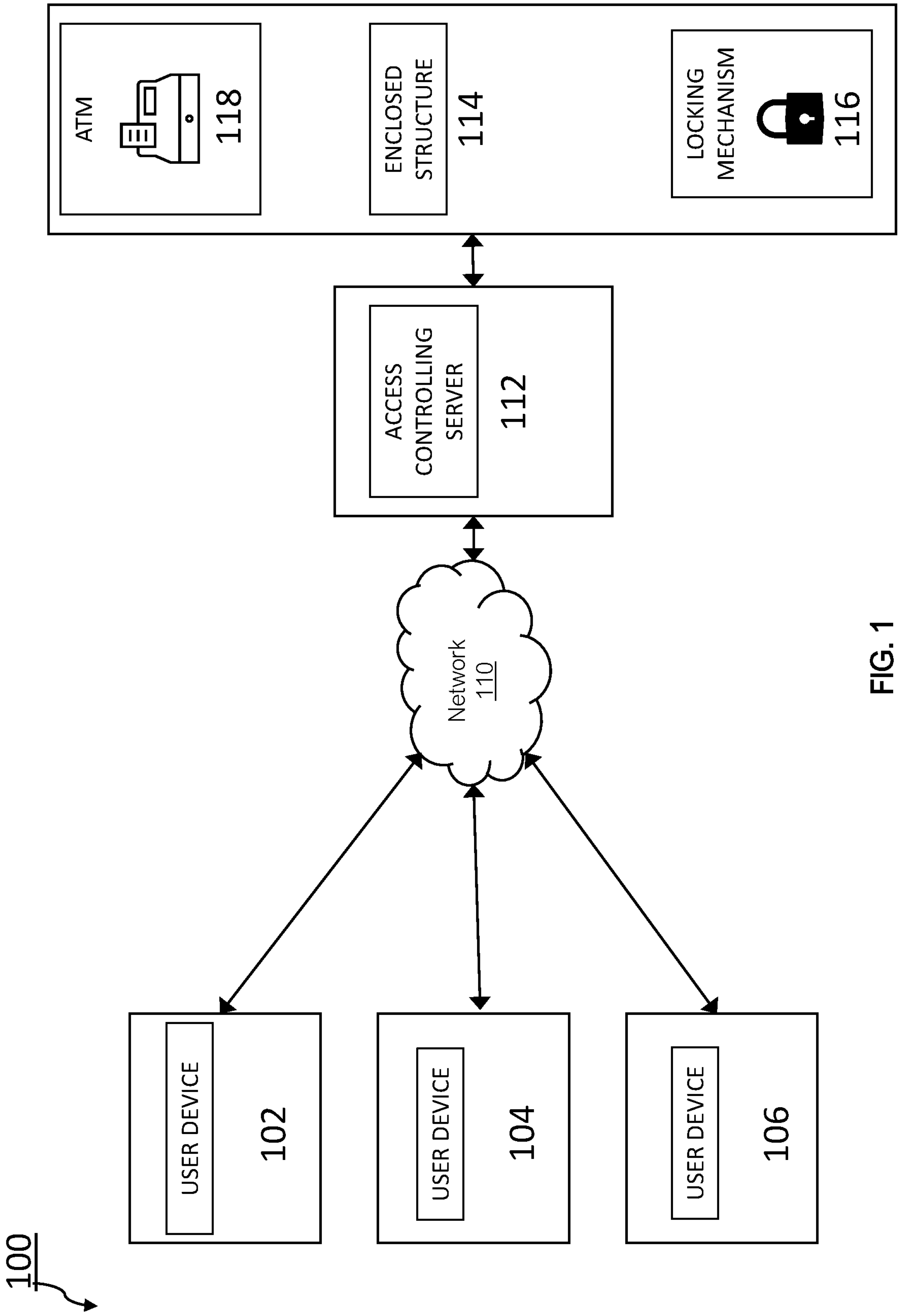
FIG. 1 is a block diagram illustrating an operating computer architecture for intermittently disabling a locking mechanism for quick entry in an enclosed area for safe shelter, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer" or "user" shall have a meaning of at least one customer or at least one user respectively.

As used herein, the term "organization" may be used interchangeably with the terms: "bank", "financial institution", "company", "business", "entity", and the like.

As used herein, the term "mobile computing device" or the like, may refer to any portable electronic device that may include relevant software and hardware. For example, a "mobile computing device" can include, but is not limited to, any electronic computing device that is able to among other things receive and process alerts, credit offers, credit requests, and credit terms from a customer or financial institution including, but not limited to, a mobile phone, smart phone, or any other reasonable mobile electronic device that may or may not be enabled with a software application (App) from the customer's financial institution.

In some embodiments, a "mobile computing device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, rewards offers, rewards terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

FIGS. 1 through 7 illustrate systems and methods of intermittently disabling and enabling a locking mechanism for quick entry in an enclosed area for safe shelter based on, for example, without limitation, ongoing dangerous conditions and, optionally, interactively engaging with users remotely using displays in the enclosed area to gather data and/or feedback and provide services and/or recommendations.

In some embodiments, the services and/or recommendations may be related to financial products and services. At least some of following embodiments provide technical solutions and technical improvements that overcome technical problems, drawbacks and/or deficiencies in the technical fields involving security access control management and/or content recommendation. As explained in more detail, below, technical solutions and technical improvements herein include aspects of improved security access control management and/or content recommendation via dynamic and/or variable feedback mechanisms to generate new inputs including new recommended content, thus avoiding static data and/or overfitting of feedback to a user and/or to a machine learning model for predicting recommendation content. Based on such technical features, further technical benefits become available to users and operators of these systems and methods. Moreover, various practical applications of the disclosed technology are also described, which provide further practical benefits to users and operators that are also new and useful improvements in the art.

In some embodiments, feedback may be generated to have variable values and/or content that may average to the average feedback. Such variable feedback may automatically adjust in response to data entries in the user profile and may avoid overfitting to detailed feedback (e.g., value and/or content) and improve user engagement with, for example, without limitations, financial services, merchants, products, online content, content recommendation, etc. by providing randomized content that is within a predetermined variability of a predetermined average target. Thus, the feedback mechanism described herein overcomes problems inherent to the content recommendation, resulting in overfitting and/or static content by adding a layer of confined randomization. Such content may include media content recommendations, social media recommendations, promotions and/or sales recommendations, among other content provided to a user in response to the activities and behavior of the user in electronic environments.

The variable and dynamic nature of the feedback provides constantly changing stimulus to content recommendation models, user profiles, and the users themselves, thus increasing the likelihood that the user would engage with a particular online service/app. For example, the recommendation feedback may be in the form of marketing advertisements in response to engaging with a chatbot on display within the enclosed structure. Ordinarily, such advertisements are static and preset. By adding in an exemplary variable feedback mechanism of at least some embodiments of the present disclosure, the advertisements may be constantly varied, e.g., randomly or algorithmically, such that the engagement averages to a particular level but provide an added stimulus to the user that incentivizes greater interactive engagement.

The technical problem of allowing access to safety enclosures with security-protected machines such as an ATM (automated teller machine) is solved by remotely controlling a physical device, such as a locking mechanism, based on one or more conditions being satisfied. According to some embodiments, there are provided exemplary computer-based systems and computer-based methods that utilize an exemplary technologically improved intermittent disabler engine of the present disclosure that would be configured/programmed for automatically changing a locking mechanism remotely based on one or more dynamic factors associated with the enclosed space.

FIG. 1 is a block diagram illustration of an exemplary illustrative system 100 used to implement one or more embodiments of the present disclosure. The components and arrangements shown in FIG. 1 are not intended to limit the disclosed embodiments, as the components used to implement the disclosed processes and features may vary. In accordance with disclosed embodiments, the system 100 may include an access controlling server 112 in communication with at least one user device 102, 104, 106 various other systems (not shown) such as additional banking/financial systems, which may interact via a network 110. It is to be appreciated that the number of user devices 102, 104, 106 can vary beyond the illustrated number of three. That is, in some embodiments, there can be fewer than three user devices 102, 104, 106, and in some embodiments, there can be more than three user devices 102, 104, 106.

The user devices 102, 104, 106 may be one or more computing devices that can include a mobile computer, desktop computer, or other computing device used by a user to generate or receive data. For example, in some embodiments, the user devices 102, 104, 106 can include, but are not limited to, a tablet device; a wearable device such as a smartwatch or the like; or the like. In some embodiments, the access controlling server 112 and the devices 102, 104, 106 are connected in electronic communication via a wireless interface.

In some embodiments, the user device 102 can be used by the user to remotely activate an entry allowance setting on a locking mechanism 116 of an entry point on the at least one enclosed structure 114 by connecting to the access controlling server 112. In some embodiments, the user can be a customer of the financial institution or the like. In some embodiments, the user may not be a customer of the financial institution or the like. For example, in some embodiments, a non-customer of the financial institution or the like can be the user.

The user devices 102, 104, 106 can communicate with the access controlling server 112 through network 110 to receive data, such as push notifications about access permissions to the at least one enclosed structure 114. The access controlling server 112 can also obtain data or output data to other computing devices, such as but not limited to, a server device or the like, and which can correspond to any electronic data acquisition processes (e.g., from third parties through an application programming interface—API).

In some embodiments, the network 110 can be the Internet or the like. In some embodiments, the network 110 can be a cellular network. In some embodiments, the network 110 can be configured for communication protocols including, but not limited to, Bluetooth, Zigbee, WiFi, combinations thereof, or the like.

In some embodiments, the access controlling server 112 may be associated with any organization or business that utilizes or interacts with the service associated with the system 100. In some embodiments, the access controlling server 112 is associated with a financial institution. For example, the access controlling server 112 is in communication with the locking mechanism 116 on the door of a financial institution's ATM 118 vestibule. In some embodiments, the access controlling server 112 operational controls the opening and closing condition of the entry door into the financial institution's ATM 118 vestibule.

In some embodiments, the access controlling server 112 may include hardware components such as a processor (not shown), which may execute instructions that may reside in local memory and/or be transmitted remotely. In some embodiments, the processor may include any type of data processing capacity, such as a hardware logic circuit, for example, an application-specific integrated circuit (ASIC) and a programmable logic, or such as a computing device, for example, a microcomputer or microcontroller that includes a programmable microprocessor.

Examples of hardware components may include one or more processors, microprocessors, circuits, circuit elements (e.g., transistors, resistors, capacitors, inductors, and so forth), integrated circuits, application-specific integrated circuits (ASIC), programmable logic devices (PLD), digital signal processors (DSP), field programmable gate array (FPGA), logic gates, registers, semiconductor device, chips, microchips, chipsets, and so forth. In some embodiments, one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, one or more processors may be dual-core processor(s), dual-core mobile processor(s), and so forth.

In some embodiments, the access controlling server 112 may be associated with a content distribution service. For example, access controlling server 112 may include a content recommendation engine that provides recommended content to users currently occupying the vestibule during a dangerous weather event. One of ordinary skill will recognize that access controlling server 112 may include one or more logically or physically distinct systems. As further described herein, the access controlling server 112 may perform operations (or methods, functions, processes, etc.) that may require access to one or more peripherals and/or modules.

The access controlling server 112 controls the locking mechanism 116 on the entry point of the at least one enclosed structure 114. In some embodiments, the at least one enclosed structure 114 may be a vestibule, or the like. In some embodiments, the at least one enclosed structure 114 may have a security-protected machine. In some embodiments, the security-protected machine may be an ATM 118. In some embodiments, the financial institution may be attached to the at least one enclosed structure 114. In some embodiments, the financial institution may not be attached to the at least one enclosed structure 114. In some embodiments, the vestibule has an interactive display or screen that presents messaging to users inside the at least one enclosed structure 114. In some embodiments, the at least one enclosed structure 114 has a speaker system that presents messaging to users inside the enclosed structure 114. In the example of FIG. 1, the access controlling server 112 includes a dangerous-condition identifier engine 202, an intermittent disabler engine 204, a machine learning model engine 206, and data output engine 208.

Figure 2:
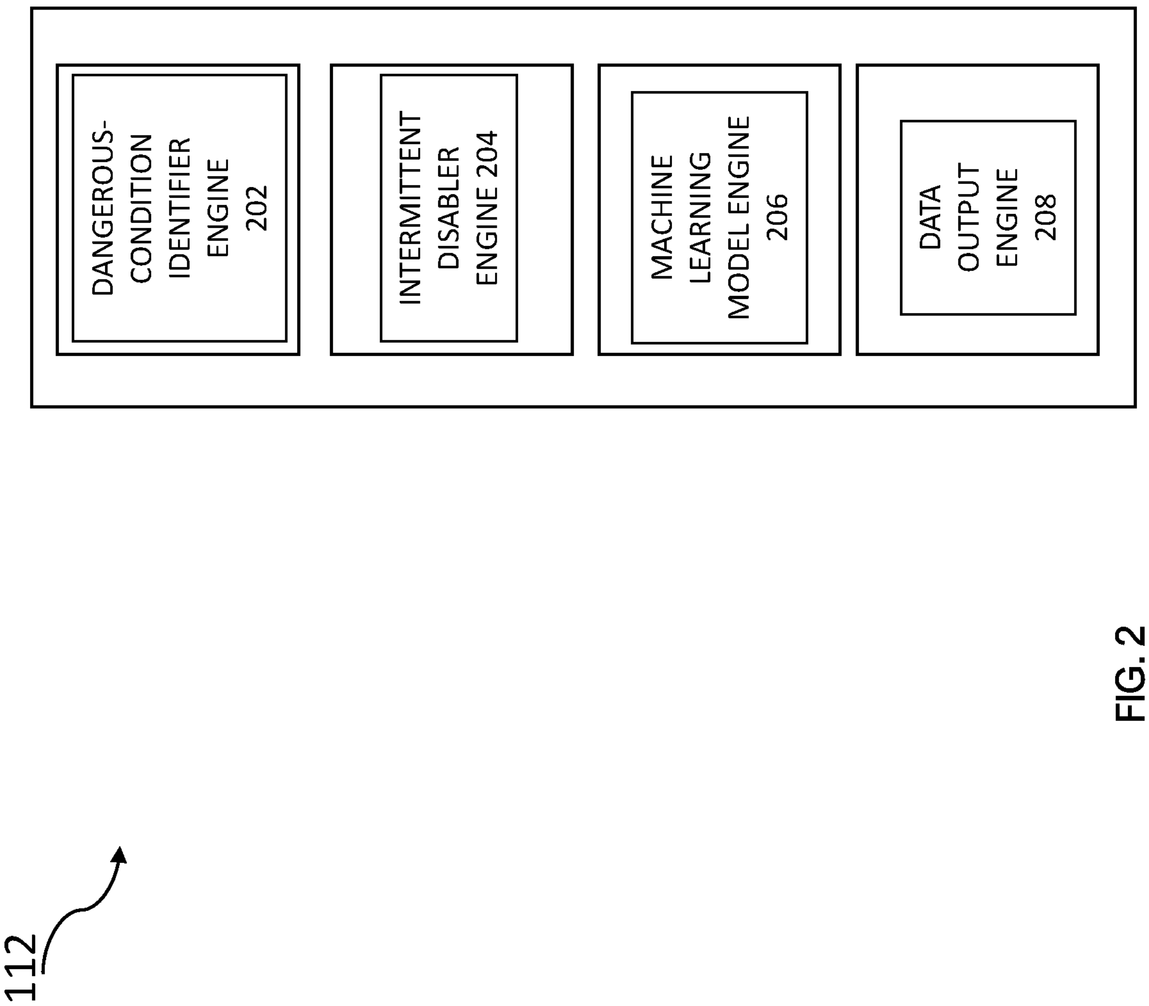
FIG. 2 is a block diagram illustrating an access controlling server as depicted in FIG. 1, according to one or more embodiments of the present disclosure.

FIG. 2 shows example components and architecture of the access controlling server 112 of the system 100 of FIG. 1, according to some embodiments. In some embodiments, the access controlling server 112 may be configured to execute software engines such as a dangerous-condition identifier engine 202, an intermittent disabler engine 204, a machine learning model engine 206, and data output engine 208.

The dangerous-condition identifier engine 202 may identify a plurality of inclement danger conditions. In some embodiments, the dangerous-condition identifier engine 202 receives, from third-party sources, a danger-related communication for the inclement danger conditions. In some embodiments, the inclement danger condition is of a predefined danger type. In some embodiments, the predefined danger type may include weather-type, criminal-type, physical-type, chemical-type, and physical-type hazards. In some embodiments, the inclement danger condition is related to the predetermined geographic area. For example, a sensor may be placed within the at least one enclosed structure 114 which may pinpoint the location and desired proximity of the location area. In some embodiments, the predetermined geographic area is within the at least one enclosed structure 114 that hosts an ATM 118. In some embodiments, the at least one enclosed structure 114 does not host an ATM 118 or be able to perform person-operated capabilities. For example, the at least one enclosed structure 114 does not have the ability to hold activities such as completing account transaction, receiving deposits and loan payments, cashing checks, and issuing savings withdrawals.

In some embodiments, the inclement danger condition is related to inclement weather conditions including but not limited to snow, sleet, frigid temperatures, high temperatures, heavy rain, hurricanes, high winds, tornadoes, or wildfires. In some embodiments, the dangerous-condition identifier engine 202 may detect inclement weather conditions based on data collected by a weather collection service, including but not limited to the National Oceanic and Atmospheric Administration (NOAA). In some embodiments, the dangerous-condition identifier engine 202 may detect inclement weather conditions by an external sensory device proximate to the location of the at least one enclosed structure 114.

The intermittent disabler engine 204 may control the locking mechanism 116 housed on the entry point of the at least one enclosed structure 114. In some embodiments, the locking mechanism 116 is an electromagnetic lock that is remotely controlled. In some embodiments, the locking mechanism 116 is a physical device that is configured to physically enable the opening or closing ability of the at least one enclosed structure 114. In some embodiments, the intermittent disabler engine 204 may be engaged through an application installed on a computing device. In some embodiments, the application installed on a computing device is configured to locate the at least one enclosed structure 114 and unlock the locking mechanism 116 on the entry point of the at least one enclosed structure 114 when the computing device is within a predetermined distance from the at least one enclosed structure 114. In some embodiments, the intermittent disabler engine 204 may disable the locking mechanism 116 to allow entry into the at least one enclosed structure 114 for a predetermined time. For example, customers may log into their financial institution application to seek shelter during a dangerous rainstorm. To minimize the time the customer needs to be outside, the customer can inform the application that the locking mechanism 116 needs to be disabled for 30 seconds for the customer to exit their vehicle and enter the at least one enclosed structure 114 comfortably. Upon the 30 seconds lapsing, the intermittent disabler engine 204 will reenable typical security protocols that are standard for the at least one enclosed structure 114. For example, if the intermittent disabler engine 204 was engaged while the at least one enclosed structure 114 was closed (such as, "after-hours") and intermittent disabler engine 204 was subsequentially disengaged, the locking mechanism 116 would revert to being in a closed condition as qualified for an "after-hours" setting.

In some embodiments, the intermittent disabler engine 204 will issue an alert to computing devices that have an application installed, informing the users that the entry allowance setting on the locking mechanism 116 of the at least one enclosed structure 114 has been enabled. In some embodiments, the entry allowance setting on the locking mechanism 116 of the at least one enclosed structure 114 may be called "quick entry mode." For example, "quick entry mode" would allow for users to enter without swiping an authorized keycard or requesting that the locking mechanism 116 unlock on the door of the at least one enclosed structure 114 due to the urgency of the situation. In some embodiments, the alert is displayed on a screen within the at least one enclosed structure 114. For example, the alert may be displayed on an ATM 118 screen in the at least one enclosed structure 114.

The machine learning model engine 206 may include, e.g., software, hardware and/or a combination thereof. In some embodiments, the machine learning model engine 206 may include a processor and a memory, the memory storing instructions.

In some embodiments, the machine learning model engine 206 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments, the machine learning model engine 206 dynamically generates personalized recommendations and feedback in response to user data received in the at least one enclosed structure 114. In some embodiments, personalized recommendations and feedback are presented through an interactive chatbot or the like. In some embodiments, the access controlling server 112 includes a rules engine for user behavior analysis and interaction-based decisions. For example, the rules engine can enable a customized digital user experience based on the user's attributes, behaviors, and interactions, as observed in the at least one enclosed structure 114.

In some embodiments, the user is identified as a customer of a financial institution. In those embodiments, the system can access information about the customer to provide personalized recommendations. In some embodiments, the users are not customers of the financial institution and/or are prospective customers of the financial institution. In those embodiments, the system can still gather information associated with the users or prospective customers to provide recommendations that are personalized based on that information.

In some embodiments, a machine learning model is generated by the machine learning model engine 206 to provide recommendations to the users. In some embodiments, the model is processed through the rules engine to determine the personalized recommendations for the users. The recommendations can be rendered to the users through a wide variety of non-traditional communication channels, including Internet desktops, smartphones, smart assistants, smart appliances, smart vehicles, drones, audiovisual (AV) outputs, and other self-adaptive Internet of Things (IoT) devices.

In some embodiments, the interaction between the user and the system is used to generate the model. Each generated model can be unique to a corresponding user in some embodiments. For example, the model for a first user may differ from the model for a second user. In some embodiments, the model generated for the given user may be dynamic, and the model in a first instance may not be identical to the model for that same user in a second instance (e.g., the second instance later in time). In some embodiments, models may be generated based on data gathered internally or externally (e.g., calls to a web service for real-time data). In some embodiments, models may be generated from user attributes, user account information, and user event data.

In some embodiments, models can be passed through the rules engine, which is comprised of an array of rules, to identify the personalized recommendation. In some embodiments, an array of rules applicable to the user may be customizable. In some embodiments, the rules engine generates recommendations based on past and current interactions with the user. For example, a user enters the at least one enclosed structure 114 to seek shelter due to a dangerous weather event. While the user utilizes the at least one enclosed structure 114 to stay safe, an artificial intelligence (AI) chatbot may initiate an interaction with the user, such as greeting and welcoming the user and asking questions. In some embodiments, the chatbot may recommend a financial product or service based on the user's responses. In some embodiments, the chatbot may solicit feedback from the user. In some embodiments, the chatbot may ask the user for feedback regarding their customer experience with a financial institution. In some embodiments, the chatbot may ask the user for feedback about why they aren't a customer of the financial institution. In some embodiments, the chatbot may present marketing materials to the user and request feedback regarding the marketing materials.

In some embodiments, the data output engine 208 may be programmed to instruct the computing device 102, 104, 106 to display at least one push notification on a graphic user interface on the computing device 102. In some embodiments, the data output engine 208 may generate an automated messaging response graphic user interface that provides textual alerts using the machine learning model engine 206. In some embodiments, the data output engine 208 may also be used to display an AI chatbot for ongoing engagement with the user and further customize the model used in the machine learning model engine 206 in a way that leverages the chatbot or chat conversation to further refine recommendations presented to that user. In some embodiments, the data output engine 208 may communicate alerts through an audio speaker system in the at least one enclosed structure 114.

Figure 3:
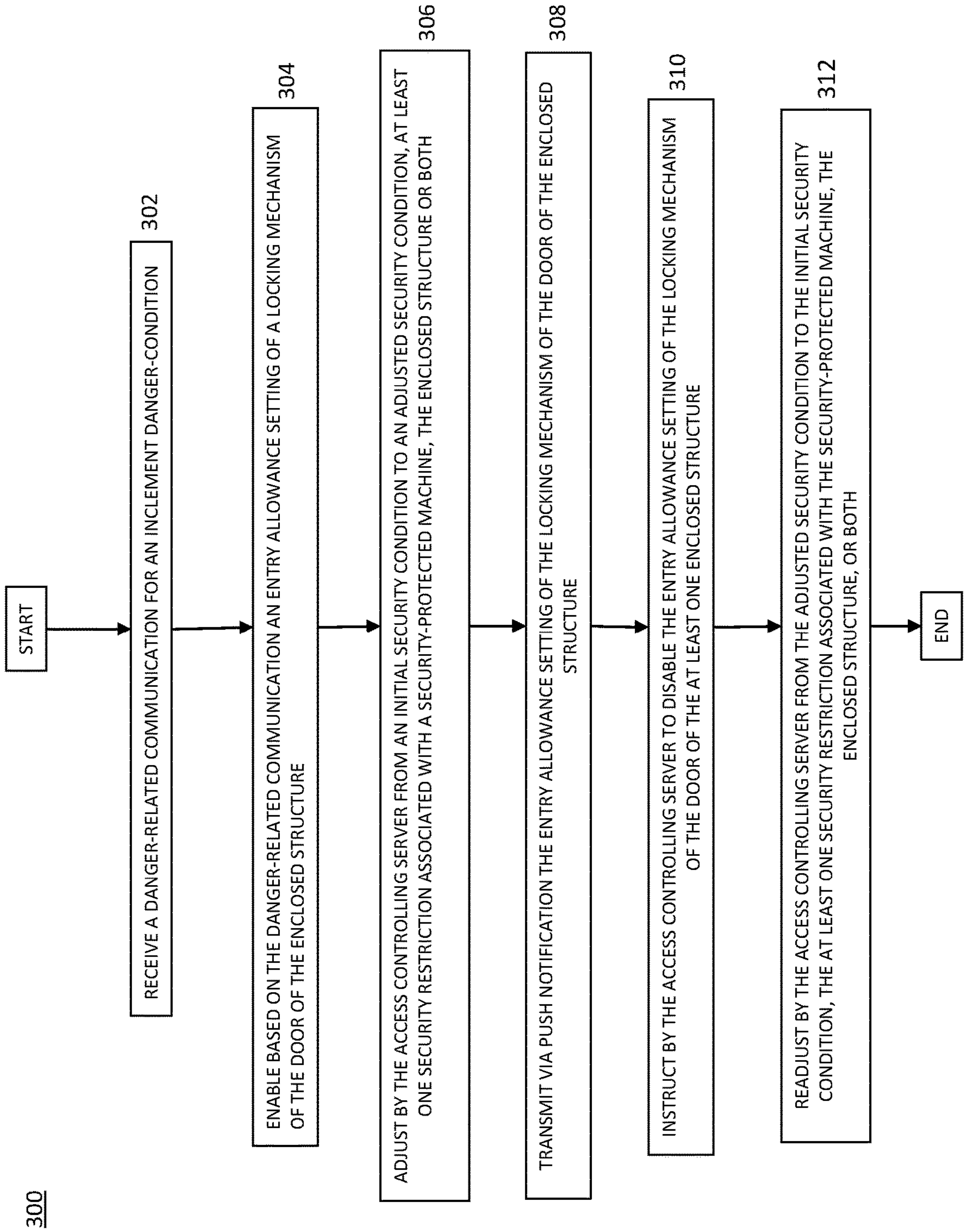
FIG. 3 is a flowchart illustrating operational steps for intermittently disabling a locking mechanism for quick entry in an enclosed area for safe shelter in accordance with one or more embodiments of the present disclosure.

FIG. 3 is a flowchart 300 illustrating operational steps for intermittently disabling a locking mechanism 116 for quick entry in the at least one enclosed structure 114 for safe shelter in accordance with one or more embodiments of the present disclosure.

In step 302, the access controlling server 112 may be programmed to receive at least one danger-related communication for an inclement danger condition. In some embodiments, the inclement danger condition is of a predefined danger type. In some embodiments, the inclement danger condition is related to a predetermined geographic area. In some embodiments, the predetermined geographic area is a location of at least one enclosed structure 114 that hosts at least one security-protected machine. In some embodiments, the at least one security-protected machine is an ATM 118. In some embodiments, at least one enclosed structure lacks person-operated capabilities. In some embodiments, the access controlling server 112 is in operational communication with a locking mechanism 116, controlling an opening condition and a closing condition of the door of the enclosed structure 114.

In step 304, the intermittent disabler engine 204 may be programmed to enable the entry allowance setting of the locking mechanism 116 of the at least one enclosed structure 114 based on the danger-related communication. In some embodiments, the at least one enclosed structure 114 contains a locking mechanism 116 on the door to enter the at least one enclosed structure 114.

In step 306, the intermittent disabler engine 204 may be programmed to adjust from an initial security condition to an adjusted security condition. In some embodiments, the at least one security restriction is associated with the at least one security-protected machine (such as, an ATM 118) or the at least one enclosed structure 114.

In step 308, the data output engine 208 transmits a push notification informing users in the predetermined geographic area that the entry allowance setting of the locking mechanism 116 being enabled. In some embodiments, the push notification is displayed on user devices 102, 104, 106, where the application is installed. In some embodiments, the push notification is an alert with messaging intended to inform a user that the enclosed structure is available as a safe shelter. In some embodiments, the data output engine 208 presents feedback and recommendations generated by the machine learning model engine 206 to the user in the at least one enclosed structure 114. In some embodiments, the data output engine 208 receives data from the user, where the machine learning model engine 206 generates a new and improved model based on the data received. In some embodiments, the data output engine 208 may utilize a chatbot to communicate and dynamically interact with the user. For example, the chatbot may conduct user research, solicit feedback, and present marketing materials to the user while the user occupies the at least one enclosed structure 114.

In step 310, the dangerous-condition identifier engine 202 determines whether the inclement danger condition is complete and instructs the intermittent disabler engine 204 to disable the entry allowance setting on the locking mechanism 116 of the door of the at least one enclosed structure. In some embodiments, the dangerous-condition identifier engine 202 determines whether the inclement danger condition is complete by continuously pinging third-party sources with the location data pertinent to the at least one enclosed structure 114 using API technologies.

In step 312, in response to the dangerous-condition identifier engine 202 determining that the inclement danger condition is complete, the intermittent disabler engine 204 readjusts from the adjusted security condition to the initial security condition. In some embodiments, the at least one security restriction is associated with the at least one security-protected machine or the at least one enclosed structure. For example, if the initial security condition had the doors locked, and the adjusted security condition unlocked the doors, then the doors would revert to the initial security condition of being locked once the inclement danger condition is completed.

Figure 4:
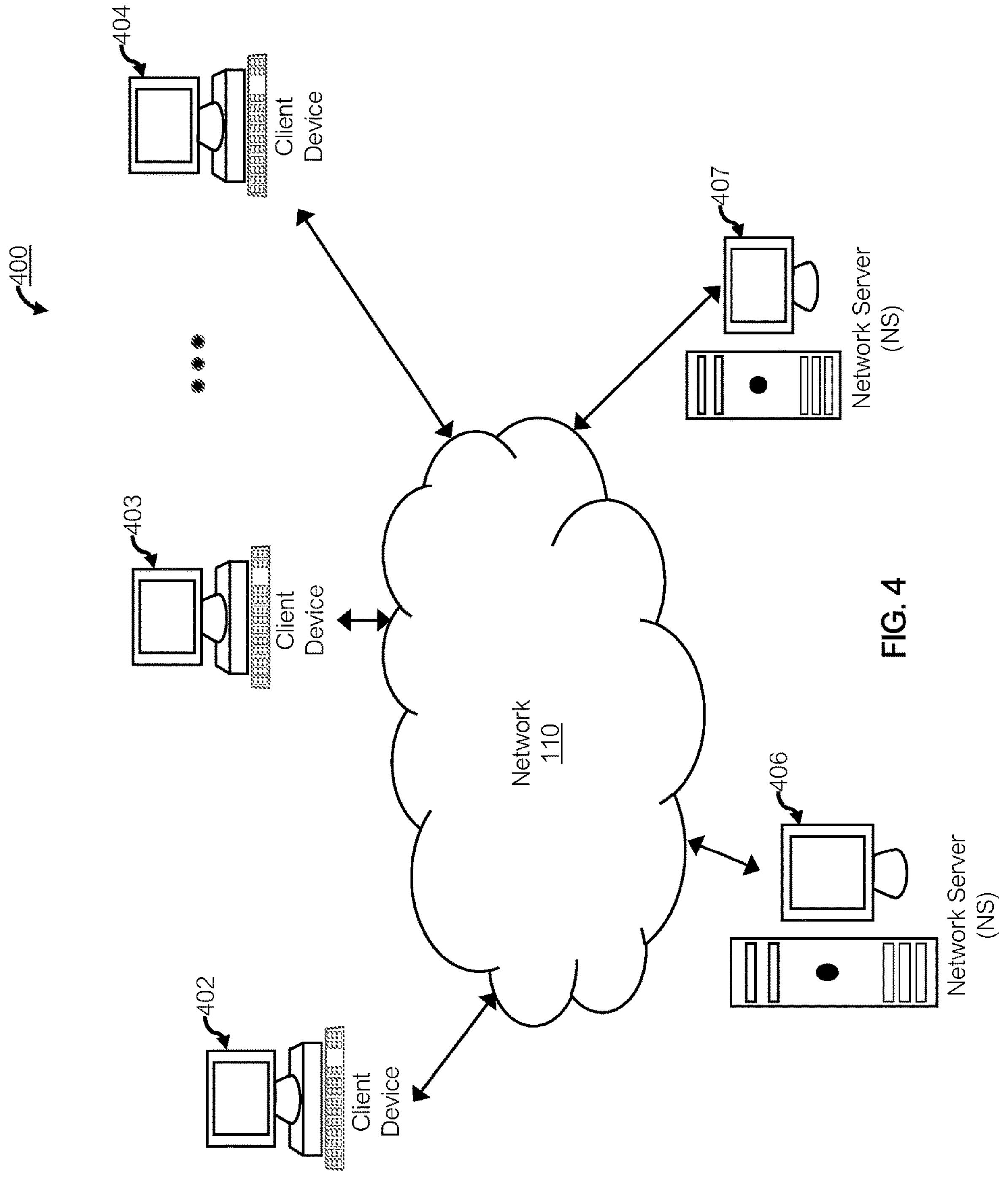
FIG. 4 depicts a block diagram of an exemplary computer-based system/platform in accordance with one or more embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates various strategies for assessing the data, caching, searching, and/or database connection pooling. An example of scalable architecture is an architecture capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like.

In some embodiments, one or more member devices within member devices 402-404 may include computing devices that typically connect using a wireless communications medium such as cell phones, smartphones, pagers, walkie-talkies, radio frequency (RF) devices, infrared (IR) devices, citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, laptop, tablet, desktop computer, a netbook, a video game device, a pager, a smartphone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.).

In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web-based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications.

In some embodiments, software components/applications can be updated and redeployed remotely as individual units or as a full software suite. In some embodiments, a member device may periodically report status or send alerts over text or email. In some embodiments, a member device may contain a data recorder that is remotely downloadable by the user using network protocols such as FTP, SSH, or other file transfer mechanisms. In some embodiments, a member device may provide several levels of user interface, for example, advanced user, standard user. In some embodiments, one or more member devices within member devices 402-404 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 110 may provide network access, data transport and/or other services to any computing device coupled to it. In some embodiments, the exemplary network 110 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 110 may include and implement, as an alternative or in conjunction with one or more of the above, a WiMAX architecture defined by the WiMAX forum. In some embodiments and, optionally, in combination of any embodiment described above or below, the exemplary network 110 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 110 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 110 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may also be implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
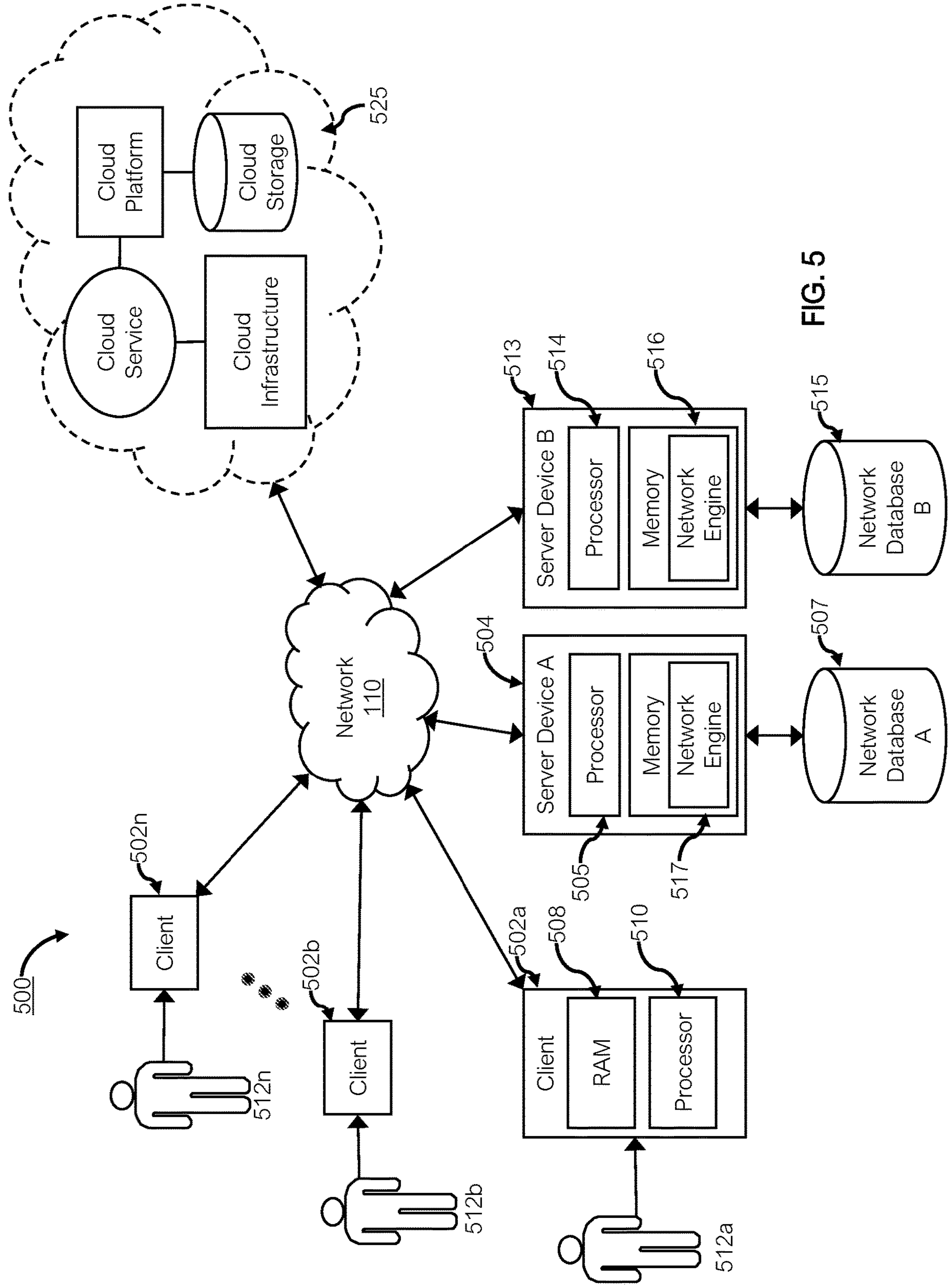
FIG. 5 depicts a block diagram of another exemplary computer-based system/platform in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502*a*, member computing device 502*b* through member computing device 502*n* shown each at least includes a computer-readable medium, such as a random-access memory (RAM) 508 coupled to a processor 510 or FLASH memory.

In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions.

In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, or other input or output devices. In some embodiments, examples of member computing devices 502*a* through 502*n* (e.g., clients) may be any type of processor-based platforms that are connected to a network 110 such as, without limitation, personal computers, digital assistants, personal digital assistants, smartphones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 110. As shown in FIG. 5, exemplary server devices 504 and 513 may include processor 505 and processor 514, respectively, as well as memory 517 and memory 516, respectively. In some embodiments, the server devices 504 and 513 may be also coupled to the network 110. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
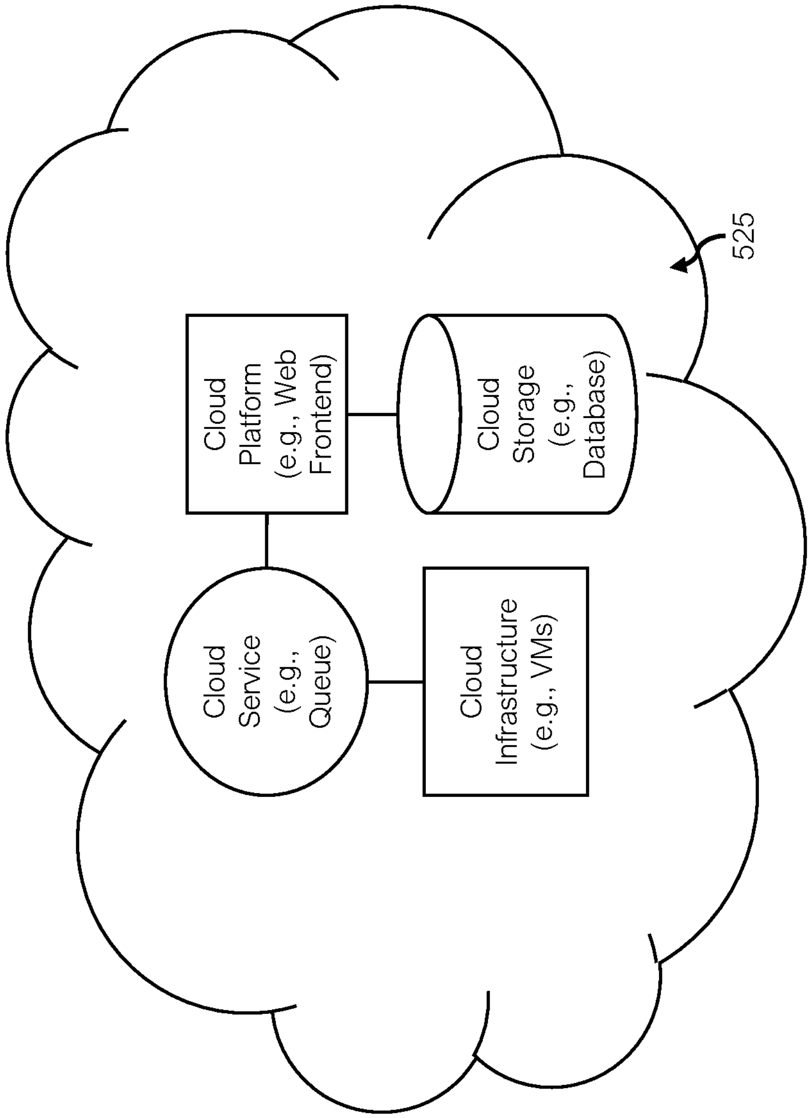
FIGS. 6 and 7 are diagrams illustrating implementations of cloud computing architecture/aspects with respect to which the disclosed technology may be specifically configured to operate, in accordance with one or more embodiments of the present disclosure.
Figure 7:
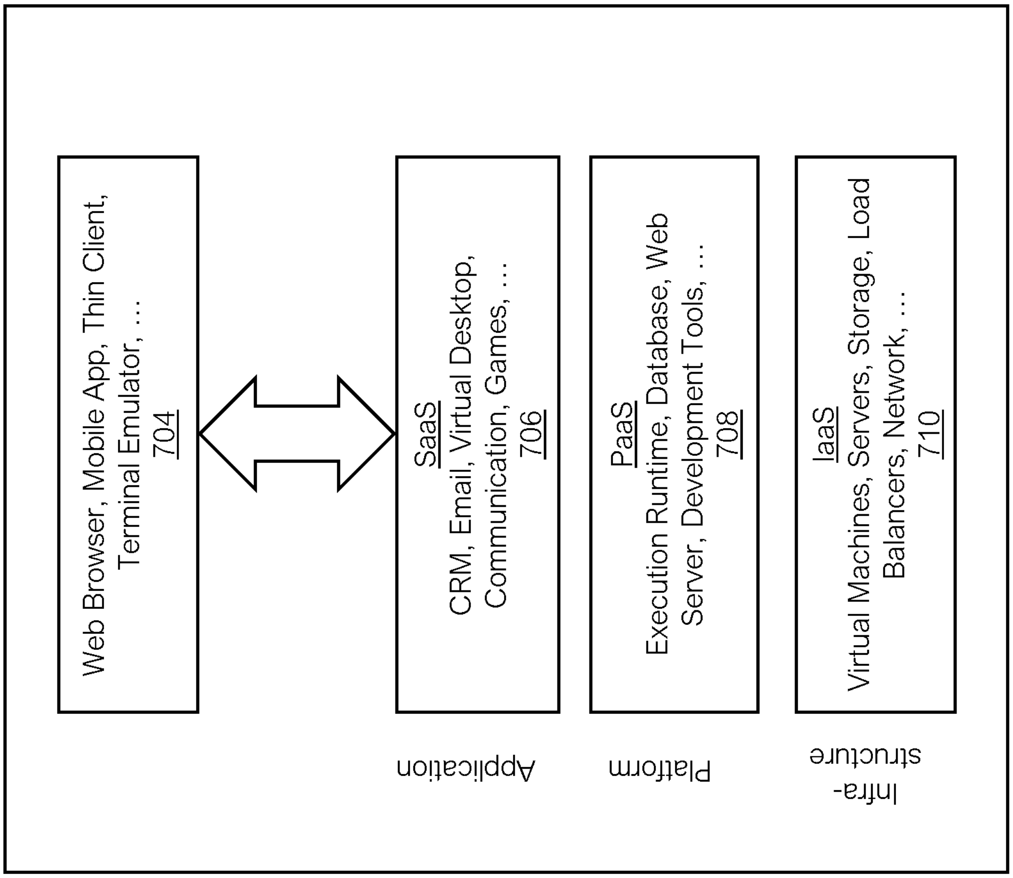

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store audio recordings, transcriptions, generated utterance vectors, and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transcriptions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., speech transcription files, tokenized vectors, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MDS, RIP-EMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transcriptions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary system of the present disclosure, utilizing at least one machine-learning model described herein.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 110 may provide network access, data transport and/or other services to any computing device coupled to it. In some embodiments, the exemplary network 110 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 110 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 110 may include and implement, as an alternative or in conjunction with one or more of the above, a WiMAX architecture defined by the WiMAX forum. In some embodiments and, optionally, in combination of any embodiment described above or below, the exemplary network 110 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 110 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 110 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., an audio recording, a transcription, vectors, tokens, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 110 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™ Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 110 with each other and/or with other systems and/or devices coupled to the network 110. As shown in FIG. 7, exemplary server devices 504 and 513 may be also coupled to the network 110. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser, mobile application, thin client, or terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model ("RNN"), a long short-term memory ("LS™") model, and a distributed long short-term memory ("DLS™") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A method may include: receiving, by an access controlling server, at least one danger-related communication for at least one inclement danger-condition in at least one geographic area; enabling, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability; adjusting, by the access controlling server, from an initial security condition to an adjusted security condition, at least one security restriction associated with the at least one security-protected machine, the at least one enclosed structure, or both; transmitting, by the access controlling server, to an application installed on a computing device of at least one user, a push notification, informing, the at least one user in the at least one geographic area, about an entry availability to enter the at least one enclosed structure to avoid the at least one inclement danger-condition; and re-adjusting, by the access controlling server, when the at least one inclement danger-condition expires, from the adjusted security condition to the initial security condition, the at least one security restriction associated with the at least one security-protected machine, the at least one enclosed structure, or both.

Clause 2. The method of clause 1, where the at least one danger-related communication for inclement danger condition is related to an inclement weather condition.

Clause 3. The method of clause 1 or 2, where the locking mechanism is controlled by an intermittent disabler engine.

Clause 4. The method of clause 1, 2, or 3, where the intermittent disabler engine is engaged through the application installed on the computing device.

Clause 5. The method of clause 1, 2, 3, or 4, where the intermittent disabler engine disables the locking mechanism to allow entry into the at least one enclosed structure for a predetermined time.

Clause 6. The method of clause 1, 2, 3, 4, or 5, where the inclement weather condition is detected by an external sensory device that is proximate to the door of the at least one enclosed structure controlled by the access controlling server; and wherein the external sensory device is configured to transmit the at least one danger-related communication to the access controlling server.

Clause 7. The method of clause 1, 2, 3, 4, 5, or 6, where the at least one enclosed structure is a vestibule and wherein the at least one security-protected machine is an automatic teller machine (ATM).

Clause 8. The method of clause 1, 2, 3, 4, 5, 6, or 7, where the locking mechanism of the door of the at least one enclosed structure is an electromagnetic lock that is remotely and operationally controlled by the access controlling server.

Clause 9. The method of clause 1, 2, 3, 4, 5, 6, 7, or 8, where the application installed on the computing device is configured to, by permission from the access controlling server, locate the at least one enclosed structure to remotely unlock the at least one enclosed structure if the computing device is within a predetermined distance from the at least one enclosed structure.

Clause 10. The method of clause 1, 2, 3, 4, 7, 8, or 9, where the at least one enclosed structure remains unlocked for a predetermined amount of time.

Clause 11. An embodiment may provide a system may include a memory configured to store computer code; and a processor configured to execute the computer code stored in the memory that causes the processor to: receive, by an access controlling server, at least one danger-related communication for at least one inclement danger-condition in at least one geographic area; enable, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability; adjust, by the access controlling server, from an initial security condition to an adjusted security condition, at least one security restriction associated with the at least one security-protected machine, the at least one enclosed structure, or both; transmit, by the access controlling server, to an application installed on a computing device of at least one user, a push notification, informing, the at least one user in the at least one geographic area, about an entry availability to enter the at least one enclosed structure to avoid the at least one inclement danger-condition; and re-adjust, by the access controlling server, when the at least one inclement danger-condition expires, from the adjusted security condition to the initial security condition, the at least one security restriction associated with the at least one security-protected machine, the at least one enclosed structure, or both.

Clause 12. The system of clause 11, where the application installed on the computing device is configured unlock the locking mechanism of the door of the at least one enclosed structure upon a request sent from the application.

Clause 13. The system of clause 11 or 12, where the entry allowance setting of the locking mechanism of the door of the at least one enclosed structure is configured to issue an alert that a quick entry mode is enabled.

Clause 14. The system of clause 11, 12, or 13, where the alert is displayed on a screen within the at least one enclosed structure.

Clause 15. The system of clause 11, 12, 13, or 14, where the alert is displayed on a screen of an automatic teller machine.

Clause 16. The system of clause 11, 12, 13, 14 or 15, where the alert is communicated through an artificial intelligence chatbot displayed on the screen within the at least one enclosed structure.

Clause 17. The system of clause 11, 12, 13, 14, 15 or 16, where the artificial intelligence chatbot dynamically interacts with the at least one user occupying the at least one enclosed structure Clause 18. The system of clause 11, 12, 13, 14, 15 16, or 17, where the artificial intelligence chatbot conducts user research, solicits feedback, and markets with the at least one user occupying the at least one enclosed structure.

Clause 19. The system of clause 11, 12, 13, 14, 15, 16, 17, or 18, where the alert is communicated through an audio speaker in the at least one enclosed structure.

Clause 20. A method may include: receiving, by an access controlling server, at least one danger-related communication for at least one inclement danger-condition in at least one geographic area; enabling, by the access controlling server, an entry allowance setting of a locking mechanism of a door of an at least one enclosed structure located within the at least one geographic area, the at least one enclosed structure hosts at least one security-protected machine and lacks a person-operated capability; adjusting, by the access controlling server, from an initial security condition to an adjusted security condition, at least one security restriction associated with the at least one security-protected machine, the at least one enclosed structure, or both; and transmitting, by the access controlling server, to an application installed on a computing device of at least one user, a push notification, informing, the at least one user in the at least one geographic area, about an entry availability to enter the at least one enclosed structure to avoid the at least one inclement danger-condition.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by an access controlling server, at least one danger-related communication for at least one inclement danger-condition in at least one geographic area;

enabling, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability;

adjusting, by the access controlling server, from an initial security condition to an adjusted security condition, at least one security restriction associated with the at least one security-protected machine, the at least one enclosed structure, or both;

transmitting, by the access controlling server, to an application installed on a computing device of at least one user, a push notification, informing, the at least one user in the at least one geographic area, about an entry availability to enter the at least one enclosed structure to avoid the at least one inclement danger-condition; and re-adjusting, by the access controlling server, when the at least one inclement danger-condition expires, from the adjusted security condition to the initial security condition, the at least one security restriction associated with the at least one security-protected machine, the at least one enclosed structure, or both.

2. The method according to claim 1, wherein the at least one danger-related communication for inclement danger condition is related to an inclement weather condition.

3. The method according to claim 2, wherein the locking mechanism is controlled by an intermittent disabler engine.

4. The method according to claim 3, wherein the intermittent disabler engine is engaged through the application installed on the computing device.

5. The method according to claim 4, wherein the intermittent disabler engine disables the locking mechanism to allow entry into the at least one enclosed structure for a predetermined time.

6. The method according to claim 2, wherein the inclement weather condition is detected by an external sensory device that is proximate to the door of the at least one enclosed structure controlled by the access controlling server; and wherein the external sensory device is configured to transmit the at least one danger-related communication to the access controlling server.

7. The method of claim 1, wherein the at least one enclosed structure is a vestibule and wherein the at least one security-protected machine is an automatic teller machine (ATM).

8. The method according to claim 1, wherein the locking mechanism of the door of the at least one enclosed structure is an electromagnetic lock that is remotely and operationally controlled by the access controlling server.

9. The method according to claim 1, wherein the application installed on the computing device is configured to, by permission from the access controlling server, locate the at least one enclosed structure to remotely unlock the at least one enclosed structure if the computing device is within a predetermined distance from the at least one enclosed structure.

10. The method according to claim 9, wherein the at least one enclosed structure remains unlocked for a predetermined amount of time.

11. A system, comprising:

a memory configured to store computer code; and a processor configured to execute the computer code stored in the memory that causes the processor to:

receive, by an access controlling server, at least one danger-related communication for at least one inclement danger-condition in at least one geographic area;

enable, by the access controlling server, based on the at least one danger-related communication, an entry allowance setting of a locking mechanism of a door of an at least one enclosed structure located within the at least one geographic area, the at least one enclosed structure hosts at least one security-protected machine and lacks a person-operated capability;

adjust, by the access controlling server, from an initial security condition to an adjusted security condition, at least one security restriction associated with the at least one security-protected machine, the at least one enclosed structure, or both;

transmit, by the access controlling server, to an application installed on a computing device of at least one user, a push notification, informing, the at least one user in the at least one geographic area, about an entry availability to enter the at least one enclosed structure to avoid the at least one inclement danger-condition; and re-adjust, by the access controlling server, when the at least one inclement danger-condition expires, from the adjusted security condition to the initial security condition, the at least one security restriction associated with the at least one security-protected machine, the at least one enclosed structure, or both.

12. The system according to claim 11, wherein the application installed on the computing device is configured unlock the locking mechanism of the door of the at least one enclosed structure upon a request sent from the application.

13. The system according to claim 11, wherein the entry allowance setting of the locking mechanism of the door of the at least one enclosed structure is configured to issue an alert that a quick entry mode is enabled.

14. The system according to claim 13, wherein the alert is displayed on a screen within the at least one enclosed structure.

15. The system according to claim 13, wherein the alert is displayed on a screen of an automatic teller machine.

16. The system according to claim 14, wherein the alert is communicated through an artificial intelligence chatbot displayed on the screen within the at least one enclosed structure.

17. The system according to claim 16, wherein the artificial intelligence chatbot dynamically interacts with the at least one user occupying the at least one enclosed structure.

18. The system according to claim 17, wherein the artificial intelligence chatbot conducts user research, solicits feedback, and markets with the at least one user occupying the at least one enclosed structure.

19. The system according to claim 13, wherein the alert is communicated through an audio speaker in the at least one enclosed structure.

20. A method comprising:

receiving, by an access controlling server, at least one danger-related communication for at least one inclement danger-condition in at least one geographic area;

enabling, by the access controlling server, an entry allowance setting of a locking mechanism of a door of an at least one enclosed structure located within the at least one geographic area, the at least one enclosed structure hosts at least one security-protected machine and lacks a person-operated capability;

adjusting, by the access controlling server, from an initial security condition to an adjusted security condition, at least one security restriction associated with the at least one security-protected machine, the at least one enclosed structure, or both; and transmitting, by the access controlling server, to an application installed on a computing device of at least one user, a push notification, informing, the at least one user in the at least one geographic area, about an entry availability to enter the at least one enclosed structure to avoid the at least one inclement danger-condition.

* * * * *